2 Sheets—Sheet 1.

L. W. BROADWELL.

FEEDERS FOR REPEATING FIRE-ARMS.

No. 7,188. Reissued June 27, 1876.

Witnesses
John Becker
Fred Haynes

L. W. Broadwell
by his Attorneys
Brown & Allen

N. PETERS, PHOTO-LITHOGRAPHER, WASHINGTON, D. C.

2 Sheets—Sheet 2.

L. W. BROADWELL.

FEEDERS FOR REPEATING FIRE-ARMS.

No. 7,188. Reissued June 27, 1876.

Witnesses
John Becker
Fred Haynes

L. W. Broadwell
by his Attorneys
Brown & Allen

N. PETERS, PHOTO-LITHOGRAPHER, WASHINGTON, D. C.

UNITED STATES PATENT OFFICE.

LEWIS WELLS BROADWELL, OF HIETZING, NEAR VIENNA, AUSTRIA.

IMPROVEMENT IN FEEDERS FOR REPEATING FIRE-ARMS.

Specification forming part of Letters Patent No. 110,338, dated December 20, 1870; reissue No. 7,188, dated June 27, 1876; application filed November 27, 1875.

*To all whom it may concern:*

Be it known that I, LEWIS WELLS BROADWELL, of Hietzing, near Vienna, Austria, formerly of Carlsruhe, in the Grand Duchy of Baden, a citizen of the United States of America, have invented certain new and useful Improvements in Feeders for Gatling and other Guns; and I do hereby declare that the following is a full, clear, and exact description of the same, reference being had to the accompanying drawing, which forms part of this specification, and in which—

Figure 1:
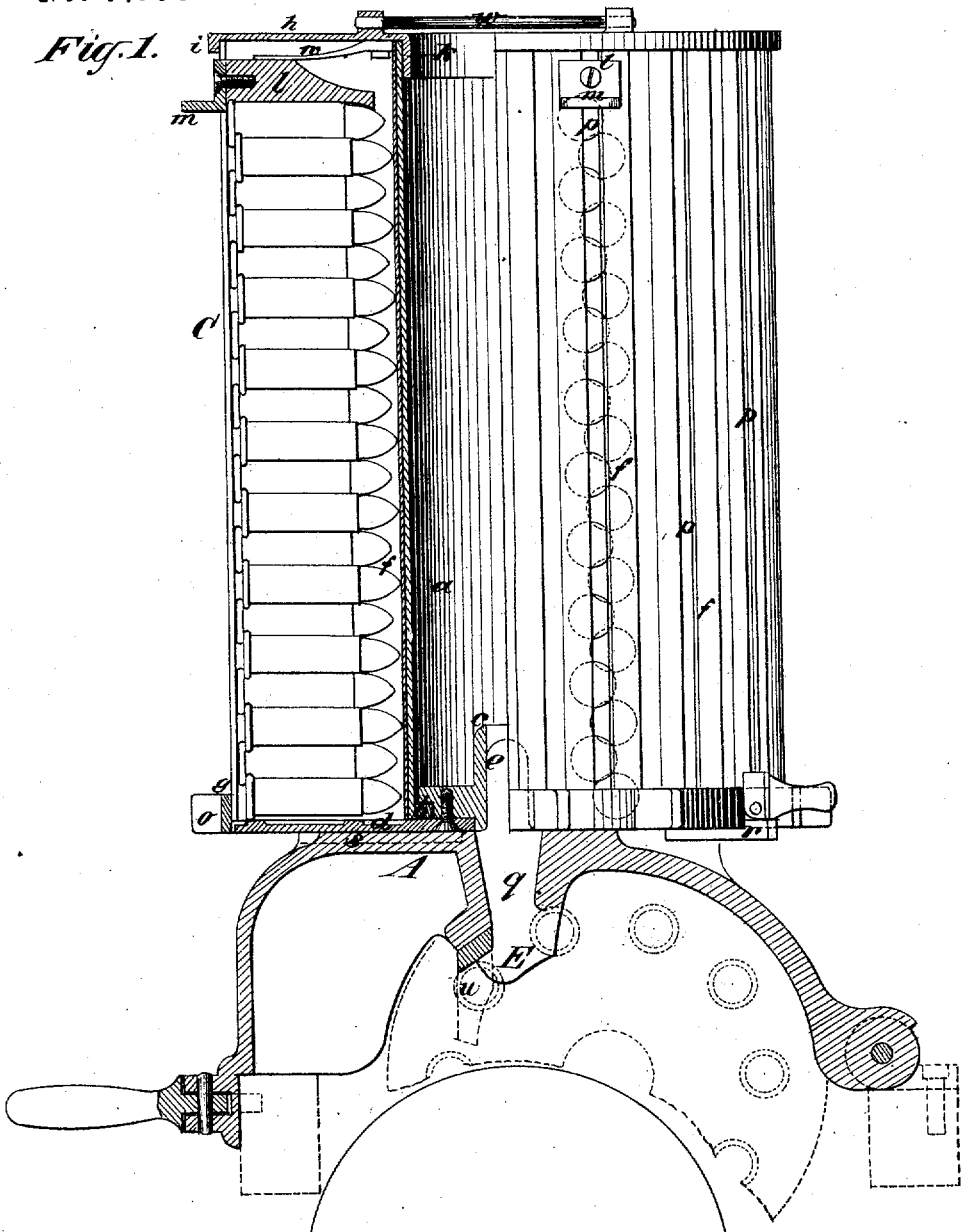
Figure 2:
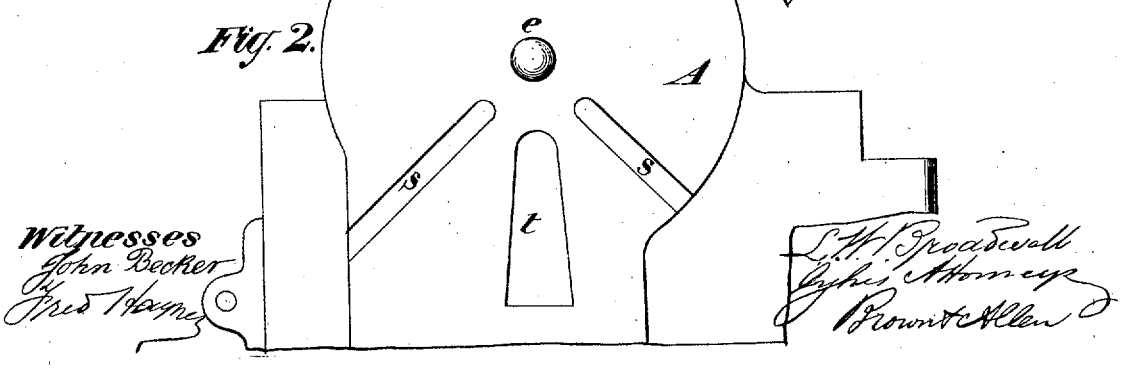
Figure 3:
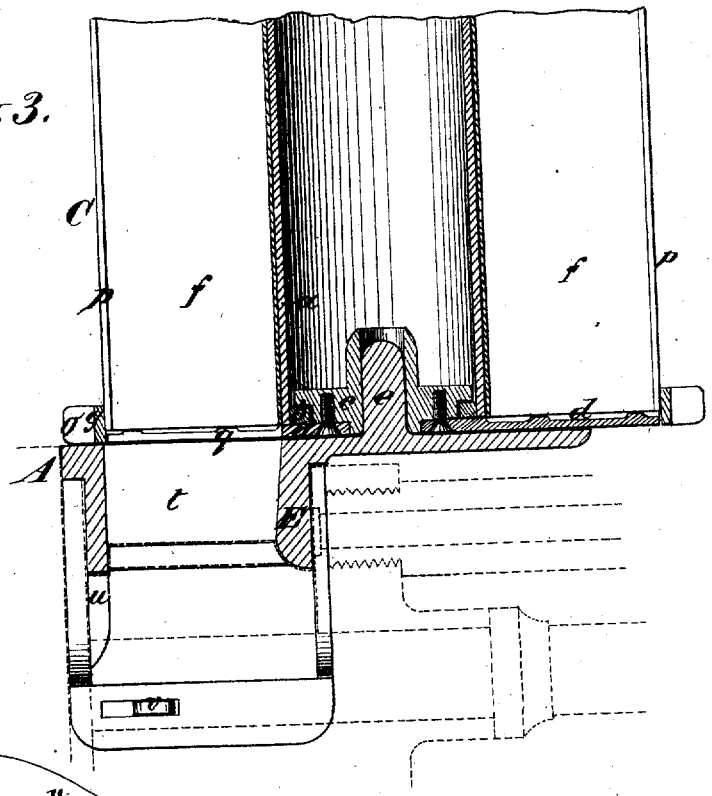

Figure 1 represents a partly-sectional elevation of a cartridge-feeding cylinder embodying my invention, with its table or support as applied to a Gatling gun. Fig. 2 is a plan of said table detached; Fig. 3, a vertical section of the same at right angles to Fig. 1, through the line *x x* in Fig. 4, which represents a horizontal section through the feeding-cylinder.

The invention consists in a cartridge-feeding case for Gatling and other machine guns, made straight in direction of its length, but with internally-contracted sides, arranged to contract the space in the feeding chamber or case near the ball end of the cartridges, and thereby cause the cartridges to lie in the case with their longitudinal axes in parallel planes, or approximately so, to insure the close packing of the cartridges, and to direct their passage through the case for proper delivery of the cartridges through the outlet of the feeding chamber or case.

The invention also consists in a revolving feeding-cylinder, provided with a series of cartridge-feeding chambers or cases, and composed of a tube, having the feeding chambers or cases, which are contracted or taper inward, arranged radially around it, the whole being suitably braced top and bottom, and connected with the tube for travel on or over a fixed bottom plate, and around a bush or journal working on a central pivot, which also occupies a fixed relation separate and distinct from that of the bottom plate, to which the bush is secured, and which has a feed-hole made in or through it.

The invention likewise includes a special and advantageous construction of a table or support, in combination with a revolving cartridge-feeding cylinder; likewise a downward projection or lip on said table, for preventing the premature entry of the cartridges into the barrels of the gun.

The first part of the invention, which relates to the internal construction at its sides of the cartridge-feeding chamber or case, will here be described as applied to a many-chambered and revolving feeding-cylinder.

Referring to the accompanying drawing, C represents the feeding-cylinder, which is composed in part of a metallic tube, *a*, that has attached to its lower end an interior projecting flange or ring, *b*, which is clamped, with freedom to turn in common with the cylinder, between a flanged brass or other suitable metal bush, *c*, and a bottom plate, *d*, which is secured by screws or otherwise to the bush, that forms a journal, and receives up within it a center or pivot pin, *e*, fast to the table A.

Figure 4:
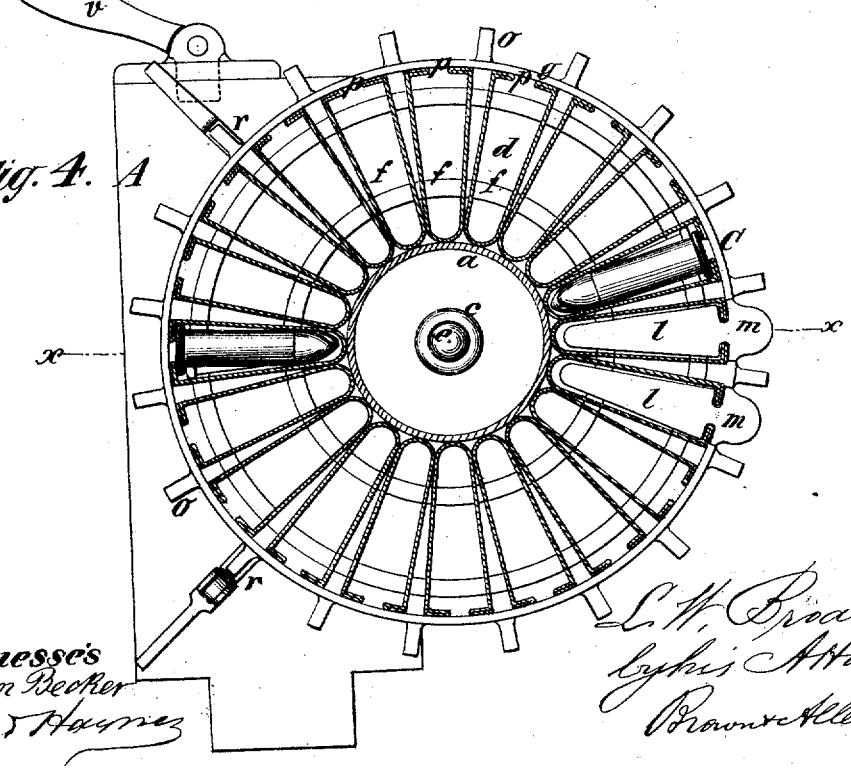

Arranged in a radial manner around the tube *a*, so as to turn with it, are the cartridge holding and feeding cases or chambers *f*, of the depth of the tube, and of the configuration represented in Fig. 4, having their narrowest portions inward. This contraction of the internal sides of each feeding case or chamber *f* contracts the space in the case near the ball end of the cartridges, and thereby causes the cartridges to lie in the case with their longitudinal axes in parallel planes, thus insuring the close packing of the cartridges, and directing their passage through the case for proper delivery of the cartridges through the outlet of the case.

The feeding-cases *f* may be contracted by forming or providing them with internal side ribs or projections, which will also serve to reduce friction, and to facilitate the fall of the cartridges. The disposition of the cartridges in the feeding-cases is represented in Figs. 1 and 4 of the drawing. Said feeding-cases are secured in position by means of a bottom outside ring, *g*, and a top plate, *h*, made with an external annular flange, *i*, the whole being united by soldering or otherwise, and the top plate *h* being similarly fastened by a flange, *k*, to the tube *a*. Each feeding-case *f* is provided with a sliding weight, *l*, having an outside lip or hand, *m*, fastened thereto. These weights rest upon the columns of cartridges in the feeding-cases; and, when they are brought successively over or in line with the feed-hole in the table A, force the cartridges quickly into the gun. The sliding weights *l* also serve to facilitate the loading or filling of the feeding-cases, which, when full, have the cartridges in them held free from rattle or shake, or are protected from injury, by means of springs *n*, arranged at the top of each feeding-case. Arranged externally around the ring *g*, and fast to it, is a series of flat projections, *o*, corresponding in number to the feeding-cases *f*, and disposed opposite the longitudinal slots *p* therein, which admits of the hands *m* being slid up or down. The bottom plate *d* has a cartridge-delivery or feed-opening, *q*, in it, of sufficient area to admit of a cartridge freely passing through it when the cylinder, with its feeding-chambers, is turned to bring a feeding-chamber over said opening. At the bottom of this plate are strips or pieces *r r*, which fit into corresponding recesses *s s* in the table A, and whereby the opening *q* is held in line over a feed hole or opening, *t*, in the table. The table A, on which the cylinder C is supported and turns around the pin *e* as a center of motion, is provided, on its under side or interior, with an ejector, *u*, which forces the extracted shells from the extractors, and thereby prevents them from interfering with the working of the gun.

It is also provided at the forward end of the feed hole or passage *t* through it with a downward projection or lip, E, which serves, as it were, to close the forward end of said feed-hole, and prevent cartridges from prematurely entering the barrels of the gun as said barrels pass such point or feed-hole. This obviates much difficulty and delay in firing the gun, the relation of which latter and its barrels to the table A, feed-hole *t* therein, ejector *u*, and downward projection or lip E, is clearly shown in Figs. 1 and 3 of the drawings.

The downward projection or lip E works in a groove cut in the forward end of a revolving cartridge-carrier, connected with or forming part of the gun. This projection is made thicker at bottom, to form a frictional surface for the points of the balls as the cartridges fall, and thus, or partly at least, counteract the natural tendency of the forward ends of the cartridges to fall quicker than their heads, which are lighter. This causes the cartridges to drop horizontally into the carrier, which is indispensable to the successful working of the gun.

The feed-table A is furthermore provided with a hooked lever, *v*, which serves to lock down the table A when the gun is being fired, said hooked lever entering a slot cut for that purpose in the frame of the gun, and being swung out of lock with the frame, when required.

The operation of my improved feeder is as follows: A loaded cylinder, C, is taken by a handle, *w*, at top, and placed on the table A, so that the pivot *e* enters the bush or journal *c*, when the cylinder is revolved until the projections *r r* drop into the recesses *s s*. The man sitting on the trail of the carriage then revolves the gun with his right hand and the cylinder C with his left hand. To revolve the latter he presses with his thumb against a curved projecting end of the one strip or piece *r*, and with his forefinger against the nearest flat projection *o* on the ring *g*, and then brings his finger and thumb together, which, by reason of the piece *r* being fixed, causes the cylinder to be turned, every time such action is repeated being just sufficient to bring a fresh feeding-case, *f*, over the feed-holes *q* and *t*, causing their contents to fall into the gun, which is fired in rapid succession.

I claim—

1. A cartridge-feeding case, made straight in direction of its length, but with its sides internally contracted and arranged, to provide for the close packing of the cartridges in the case, and their straight or proper delivery through the outlet of the latter, substantially as described.

2. The revolving feeding-cylinder, constructed and operated substantially as described, and for the purpose herein set forth.

3. The table or support A, in combination with the revolving feeding-cylinder, essentially as shown and described.

4. The under projection or lip E, as shown, and for the object specified.

In testimony whereof I have hereunto signed my name in the presence of two subscribing witnesses this 9th day of April, 1875.

L. W. BROADWELL.

Witnesses:

PHILIP SIDNEY POST,

WILLIAM HÜNING.